United States Patent [19]

Sado et al.

[11] 4,288,792

[45] Sep. 8, 1981

[54] ELECTRONIC APPARATUS WITH TIME-DIVISION DRIVE

[75] Inventors: Ichiro Sado; Juji Kishimoto, both of Tokyo; Hiroshi Murata, Machida, all of Japan

[73] Assignee: Canon Kabushiki Kaisha, Tokyo, Japan

[21] Appl. No.: 972,281

[22] Filed: Dec. 22, 1978

[30] Foreign Application Priority Data

Dec. 28, 1977 [JP] Japan ............................ 52-160620

[51] Int. Cl.³ ............................................ G06F 3/14

[52] U.S. Cl. ................................ 340/756; 340/802; 340/789

[58] Field of Search ...................... 340/802, 756–765, 340/789

[56] References Cited

U.S. PATENT DOCUMENTS

| | | | |
|---|---|---|---|
| 3,786,487 | 1/1974 | Yanagisawa | 340/802 |
| 3,789,388 | 1/1974 | Medwin | 340/802 |
| 3,925,777 | 12/1975 | Clark | 340/802 |
| 4,005,404 | 1/1977 | Soobik | 340/802 |
| 4,125,993 | 11/1978 | Emile, Jr. | 340/802 |

*Primary Examiner*—Marshall M. Curtis
*Attorney, Agent, or Firm*—Fitzpatrick, Cella, Harper & Scinto

[57] ABSTRACT

An electronic apparatus comprises a phase signal generator for generating mutually different phase signals, one of which is selectively supplied to plurality means driven by a time-division drive.

15 Claims, 7 Drawing Figures

FIG. 1
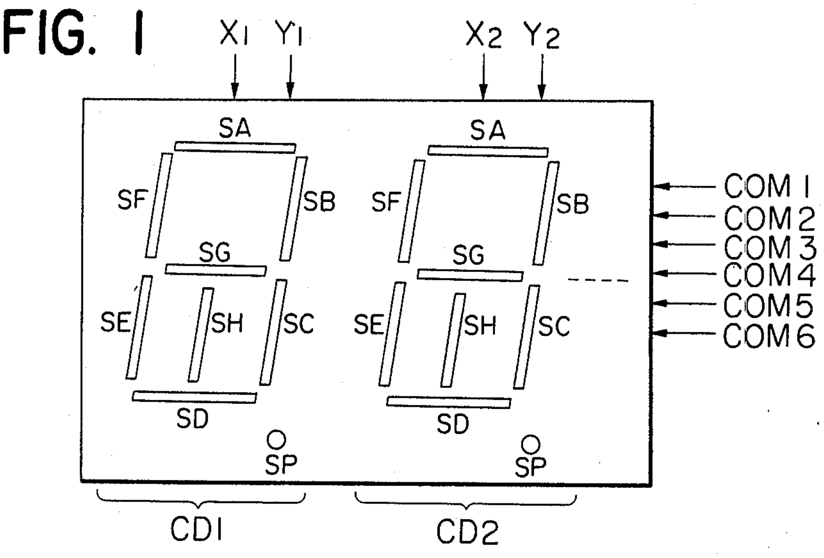
FIG. 2
| | COM1 | COM2 | COM3 | COM4 | COM5 | COM6 |
|---|---|---|---|---|---|---|
| X1 | SF | SE | SD | | SH | SP |
| Y1 | SA | SB | SG | SC | | |
FIG. 3
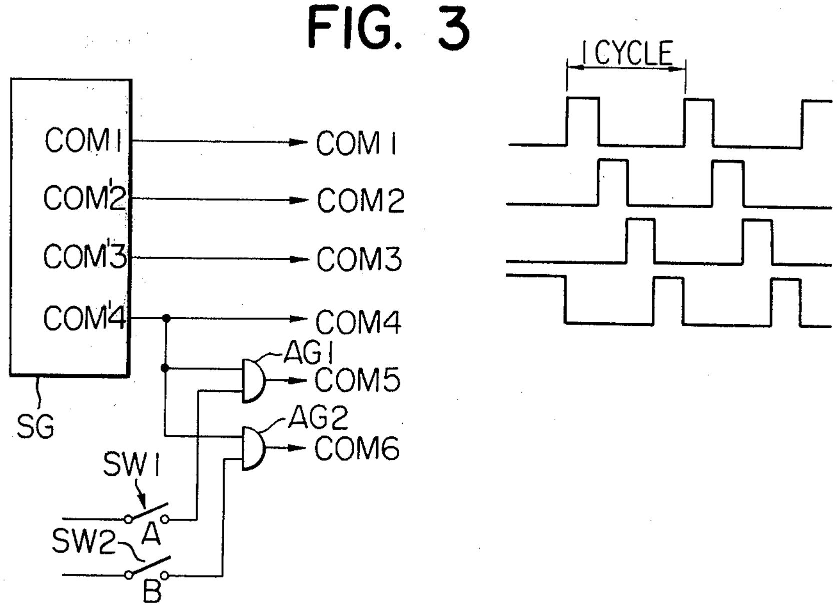

ELECTRONIC APPARATUS WITH TIME-DIVISION DRIVE

BACKGROUND OF THE INVENTION

1. Field of the Invention

The present invention relates to an electronic apparatus improved in the connection between an object device to be driven in accordance with a time-division driving scheme and a drive circuit for driving said object device.

2. Description of the Prior Art

As an example of a display device according to a time-division driving scheme there has been known a liquid crystal display device, which has progressively been improved in the response performance, so that the duty ratio of the drive pulses from $\frac{1}{2}$ to $\frac{1}{3}$, and further to $\frac{1}{4}$ is reduced.

Such improvement has enabled a reduction in the number of terminals for connecting between the display device and a drive circuit. For example in case of a numerical display according to a time-division driving scheme on an array of plural display elements each having 7 bar segments and a dot segment, there are required, for each display element, four terminals for supplying time-division signals for a drive with a duty ratio of $\frac{1}{4}$ and two information signal terminals for supplying numerical information.

However, in order to increase the number of displayable symbols by providing additional mark segments, there will be required three information signal terminals for each display element since the duty ratio cannot be reduced. For example in case of driving a 10-digit display device each having 9 segments with drive pulses of a duty ratio of $\frac{1}{4}$, there will be required $3\times10+4=34$ segments.

SUMMARY OF THE INVENTION

The object of the present invention is to provide an electronic apparatus capable of reducing the number of terminals connecting an object device to be driven by a time-division drive and a drive circuit therefor.

Another object of the present invention is to provide an electronic apparatus capable of increasing the number of displayable symbols without altering the duty ratio and without a significant increase in the number of terminals.

Still another object of the present invention is to provide an electronic apparatus comprising means for generating mutually different phase signals, one of which is selectively supplied to plural object devices to be driven by a time-division control.

Still other objects of the present invention will be made apparent from the following description of the preferred embodiments taken in conjunction with the attached drawings.

BRIEF DESCRIPTION OF THE DRAWINGS

FIG. 1 is a view of disply elements embodying the present invention;

FIG. 2 is a diagram showing the selection of segments;

FIG. 3 is a block diagram of an embodiment of the present invention;

DESCRIPTION OF THE PREFERRED EMBODIMENTS

Referring to FIG. 1 showing an example of display elements embodying the present invention, there are shown common terminals COM1–COM6 for supplying time-division signals, and information signal terminals Xi, Yi (i=1, 2) for supplying the signals representing the information to be displayed on the display elements.

The numerical information may be represented by seven bar segments in the figure ⊟ and a dot segment on each display element mentioned above, and alphabetical information may be represented by eight bar segments in the figure ⊞ and a dot segment. Accordingly, both the numerical and alphabetical information may be selectively represented by provision of nine segments including eight bar segments in figure ⊞ and one dot segment in accordance with switching of signal application to the common terminals.

In FIG. 1 the 9 segments including said dot segment are driven with a duty ratio of $\frac{1}{4}$. Said terminals COM1–COM6 are common to all the display elements, wherein the terminals COM1–COM4 receive the time-division signals repeated cyclically in the conventional manner, while the terminals COM5 and COM6 occasionally receive the signal to be supplied to the terminal COM4. Also the terminals Xi, Yi (i=1, 2) receive the signals corresponding to the information to be displayed on each digit.

FIG. 2 shows the relation between the terminals Xi, Yi (i=1, 2), the common terminals COM1–COM6 and the segments SA–SH, SP. More specifically the segment SF is lighted upon receipt of signals by the terminals Xi and COM1, similarly the segment SA by the terminals Yi and COM1, the segment SE by the terminals Xi and COM2, the segment SB by the terminals Yi and COM2, the segment SD by the terminals Xi and COM3, the segment SG by the terminals Yi and COM3, the segment SC by the terminals Yi and COM4, the segment SH by the terminals Xi and COM5, and the segment SP by the terminals Xi and COM6.

The above-mentioned display element is composed of a liquid crystal material sandwiched between glass plates which are respectively provided thereon with transparent segment electrodes SA–SH, SP and transparent common electrodes COM1–COM6.

FIG. 3 is a block diagram of an embodiment of the present invention in which there are shown a signal generator SG for generating four time-division signals in a cyclic manner, and AND gates AG1, AG2 for supplying the signal applied to the terminal COM4 also to the terminals COM5 and COM6 selectively according to mode signals A and B, respectively standing for an alphabet display mode and a numeral display mode.

Figure 3A:
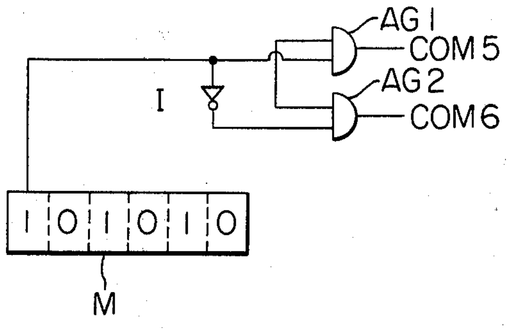
FIG. 3A is a block diagram of another embodiment of the present invention.

Said mode signal may be obtained by manual actuation of manual switches SW1, SW2 as shown in FIG. 3, or may be obtained by information included in the information to be displaced as shown in FIGS. 3A, which is applied to the AND gate AG2 through the AND gate AG1 or an inverter I.

Figure 4:
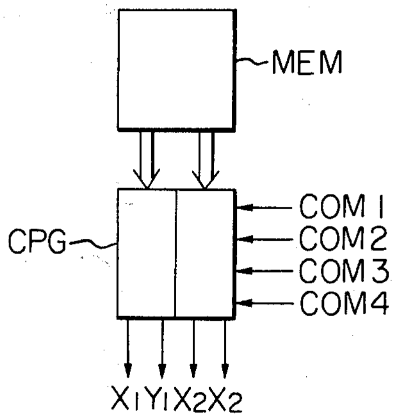
FIG. 4 is a block diagram of a display information signal output circuit.

FIG. 4 shows a circuit for generating signals Xi, Yi to be supplied to the display elements shown in FIG. 1, wherein MEM is a memory storing the information to be displayed. In the illustrated example the memory stores two information in a binary code. CPG is a character pattern generator for converting the information stored in said memory MEM into the information of a display pattern and supplies the thus converted information to the terminals Xi and Yi. The illustrated embodiment is designed for the display of two characters, but the structure is expandable for the display of a larger number of characters.

The function of the foregoing embodiment is explained in the following. In case of the display of a numeral a mode signal B is supplied to open the AND gate AG2 thereby enabling to drive the segment SP, while in the alphabetical display for example of a character "Q" the AND gate AG1 is selected to distribute the signal to the terminal COM4 also to the terminal COM5 thereby driving the segment SH.

Figure 5:
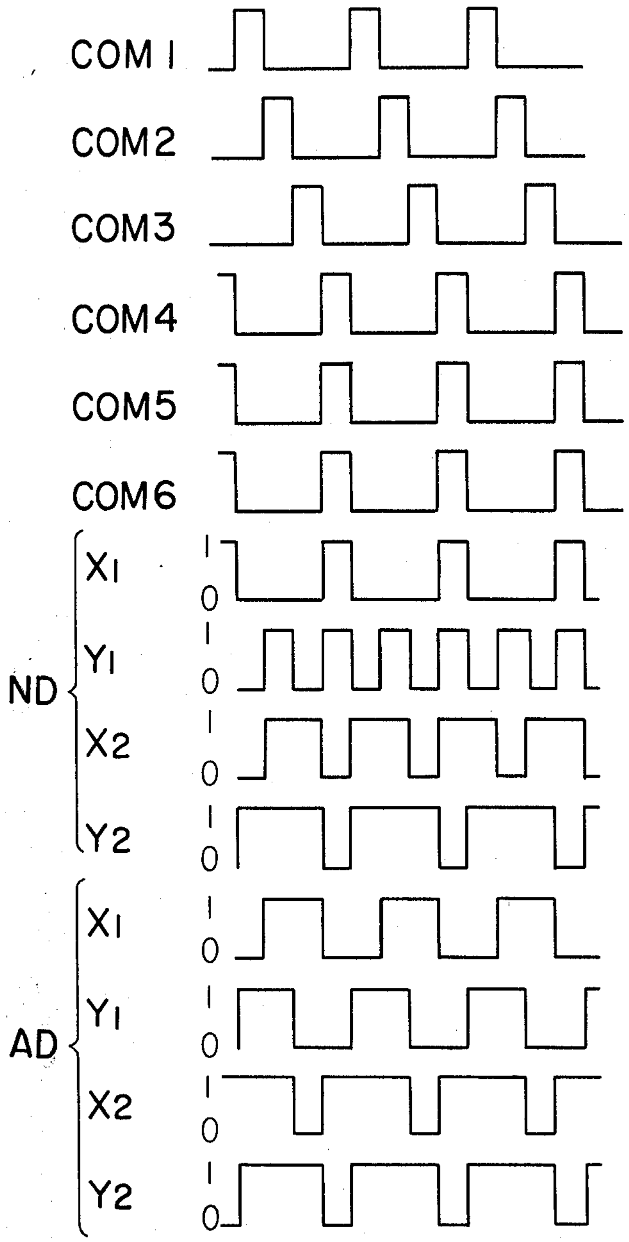
FIG. 5 is a wave-form chart of various signals.

Now let us assume that a numerical information "1.2" is stored in the memory MEM for the display, and a mode signal B is supplied to apply the time-division signal to the common terminal COM6 through the AND gate AG2. Also it is assumed that the dot information is memorized in the same memory address as that for the numeral "1". In order to display "1." on the display element CD1, the character pattern generator CPG releases the signals X1 , Y1 shown by ND in FIG. 5. The display "1." is performed by lighting the segments SB, SC and SP. Consequently said character pattern generator CPG releases said signals X1 and Y1 in synchronization with the time-division signals for driving said segments SB, SC and SP, whereby the display "1." being performed by the coincidence of said time-division signals and the display information signals. Likewise the display "2" is performed by the coincidence of time-division signals and the display information signals X2, Y2, shown by ND in FIG. 5, released by the character pattern generator CPG for driving the segments SA, SB, SG and SE.

Also in case of the display of "QR" respectively by the display elements CD1 and CD2, the memory MEM stores the corresponding coded information and a mode signal A opens the AND gate AG1 to supply the time-division signal to the terminal COM5. In this case the character pattern generator CPG generates the signals X1, Y1 shown by AD in FIG. 5 to drive the segments SA, SB, SC, SD, SE, SF and SH whereby the display "Q" being performed by the coincidence of the time-division signal and said signals X1, Y1, in the display element CD1. Likewise the character pattern generator CPG generates the signals X2, Y2 shown by AD in FIG. 5 to drive the segments SA, SB, SE, SF, SG and SH, whereby the display "R" being performed by the coincidence of the time-division signal and said signals X2, Y2 in the display element CD2.

Thus, as explained in the foregoing, it is render possible to reduce the number of terminals for connecting the display device with the drive circuit by supplying the time-division signals also to other display elements.

Figure 6:
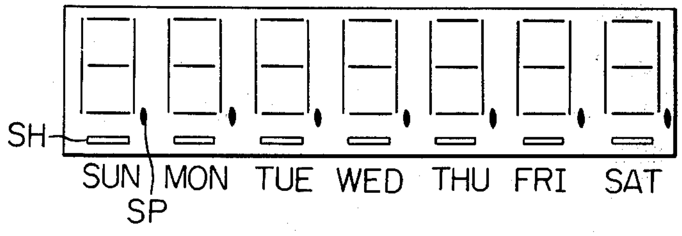
FIG. 6 is an external view of another display device.

Although the foregoing explanation is limited to the display of numerical information and alphabetical information, it is also possible to obtain a display device capable, in a similar manner, of displaying numerical information and time information. For example the day of the week is to be displayed under each digit, the segment SH is placed as shown in FIG. 6 and the display device can be structured to display a result of calculation or a time information in the first mode and to display the information on the year, month, day and the day of the week in the second mode.

As detailedly explained in the foregoing, the present invention enables to reduce the number of terminals in total by using, for a display with a duty ratio of 1/N, common terminals of a number in excess of N.

What is claimed is:

1. An electronic apparatus having a device to be driven on the time division basis, comprising:

a plurality of objects to be driven;

signal generating means for generating a plurality of signals of mutually different phases;

means for applying the plurality of signals obtained from said signal generating means to several of said driven objects;

means for producing additional signals from a certain one of the signals generated from said signal generating means, wherein said additional signals are applied to the remaining objects to be driven, said additional signal producing means including means for selecting among said remaining objects the object to be driven by said additional signals; and means for generating information signals;

said device including means for receiving the additional signals from said additional signal producing means and the information signals from said information signal generating means to control the operation of said one object.

2. An electronic apparatus according to claim 1 wherein said selecting means includes manual switches.

3. An electronic apparatus according to claim 1, wherein said selecting means is adapted to function in response to the information signals.

4. An electronic apparatus according to claim 1, wherein said plurality of objects to be driven are display elements for displaying information.

5. An electronic apparatus according to claim 4 wherein said selecting means selects the display information to be displayed by said display elements.

6. An electronic apparatus according to claim 5, wherein said display elements comprise liquid crystals.

7. An electronic apparatus according to claim 2, wherein said plurality of objects to be driven are display elements for displaying information.

8. An electronic apparatus according to claim 3, wherein said plurality of objects to be driven are display elements for displaying information.

9. An electronic apparatus according to claim 7, wherein said display elements comprise liquid crystals.

10. An electronic apparatus according to claim 8, wherein said display elements comprise liquid crystals.

11. An electronic apparatus according to claim 10, wherein said selecting means selects the display information to be displayed by said display elements.

12. An electronic display apparatus comprising:

display means comprising a plurality of display elements for displaying information, said display means having a first group of signal input terminals, a second group of signal input terminals, and a third group of signal input terminals;

signal generating means for generating a plurality of signals of mutually different phases, wherein each of the signals is applied to the associated one of said first group of signal input terminals, respectively;

means for producing additional signals from a certain one of the signals generated from said signal generating means, wherein each of said additional signals is applied to the associated one of said second group of signal input terminals, respectively, said additional signal producing means including selecting means for selecting certain display elements to be displayed on said display means; and means for generating display information signals to be applied to the third group of signal input terminals;

whereby said display means receives the signals from said signal generating means, the additional signals from said additional signal producing means, and the display information signals from said display information signal generating means to control the operation of said selected display elements.

13. An electronic apparatus according to claim 12 wherein said selecting means includes means for decoding the display information to be displayed on said display means.

14. An electronic apparatus according to claim 12 wherein said selecting means includes manual switches for selecting the display information to be displayed on said display means.

15. An electronic display apparatus comprising:

display means comprising a plurality of display elements for displaying information, said display means having first signal input terminals, second signal input terminals, and third signal input terminals;

signal generating means for generating signals which are applied to said first signal input terminals;

selecting means for selecting certain elements to be displayed by applying signals from said signal generating means to a selected one of said second signal input terminals of said display means; and means for generating display information signals to be applied to said third signal input terminals;

whereby said display means receives the display information signals from said display information signal generating means, the signals from said signal generating means, and the signals from said selecting means to control the operation of the selected display elements.

* * * * *